(12) United States Patent
Alzamil

(10) Patent No.: US 8,484,380 B2
(45) Date of Patent: Jul. 9, 2013

(54) TEXT-BASED SYSTEM FOR EXCHANGING COMMANDS BETWEEN DEVICES, SERVICES AND APPLICATIONS

(76) Inventor: Abdullah Abdulrhman M. Alzamil, Riyadh (SA)

(*) Notice: Subject to any disclaimer, the term of this patent is extended or adjusted under 35 U.S.C. 154(b) by 436 days.

(21) Appl. No.: 12/887,654

(22) Filed: Sep. 22, 2010

(65) Prior Publication Data
US 2012/0072559 A1    Mar. 22, 2012

(51) Int. Cl.
*G06F 15/16* (2006.01)
(52) U.S. Cl.
USPC .......................................... 709/246; 709/206
(58) Field of Classification Search
USPC ............................ 709/206, 207, 246
See application file for complete search history.

(56) References Cited

U.S. PATENT DOCUMENTS

| 6,610,102 B1 * | 8/2003 | Aldred et al. ............... 715/234 |
| 7,245,902 B2 * | 7/2007 | Hawkes ....................... 455/411 |
| 8,204,827 B1 * | 6/2012 | Gupta et al. .................. 705/40 |

* cited by examiner

*Primary Examiner* — Brian J Gillis
(74) *Attorney, Agent, or Firm* — Andrew M. Calderon; Roberts Mlotkowski Safran & Cole, P.C.

(57) ABSTRACT

A method, computer program product, and computer system is provided for exchanging text-based commands between clients, services, and/or applications. The method includes receiving, in a processor, a text-based command assigned to a service command configured to control at least one service of a computing device. The method also includes translating the text-based command into the service command based on a look-up table. The service command is provided to the service. The service is controlled based on the service command.

20 Claims, 8 Drawing Sheets

| . | ? | ¿ | , | ' | ! | " | ' | - | ( | ) | @ | / |
|---|---|---|---|---|---|---|---|---|---|---|---|---|
| : | _ | ; | + | % | * | = | > | < | £ | € | $ | ¥ |
| ¤ | ] | [ | } | { | \ | ~ | ^ | ¡ | ¿ | § | # | \| |

FIG. 3A

| . | ? | ¿ | , | ' | ! | " | ' | - | ( | ) | @ | / |
|---|---|---|---|---|---|---|---|---|---|---|---|---|
| : | _ | ; | + | % | * | = | > | < | $ | ] | [ | } |
| { | \ | ~ | ^ | # | \| | | | | | | | |

| Key | Service | Key | Service |
|---|---|---|---|
| ( | add member | > | next |
| ) | delete member | < | previous |
| * | register domain | ¡ | name info |
| # | delete domain | \ | private group |
| ~ | send to group | / | public group |
| = | add tag | { | subscribe |
| ? | find domain | } | unsubscribe |
| $ | send message | [ | unban user |
| @ | Inbox | ` | add name |
| ! | default name | \| | n/a |
| % | vote | ¿ | n/a |
| § | support answer | , | n/a |
| ] | ban user | ; | n/a |
| ¥ | advertisement by sms | ¤ | n/a |
| £ | advertisement by web | € | n/a |
| " | show tags | . | n/a |
| ' | delete tag | & | n/a |
| + | write blog | : | open category |
| - | delete blog | l | |
| ^ | read blog | t | |

| Key | Service |
|---|---|
| c | commands |
| e | English |
| q | exit all groups |
| s | support |
| b | messages balance |
| i | my visitors |
| a | my names |
| r | recharge messages |
| f | my friends |
| u | Arabic |
| d | delete all names |
| x | receive off |
| j | subscribe |
| w | password |
| g | my visits |
| p | my points |
| o | random names |
| y | vote results |
| i | new members |
| t | receive on |

FIG. 4B

TEXT-BASED SYSTEM FOR EXCHANGING COMMANDS BETWEEN DEVICES, SERVICES AND APPLICATIONS

FIELD OF THE INVENTION

The invention relates to a method, computer program product and computer system for exchanging commands and, more particularly, to a method, computer program product, computer system and telecommunication system for exchanging text-based commands between clients, servers, services, and/or applications.

BACKGROUND OF THE INVENTION

With more consumers being able to access the Internet and cellular networks, web and mobile services have increased in popularity. One such web and mobile service, the social network, has become extremely popular, with some social networks featuring millions of users. These social networks provide means for users to interact over the Internet, such as e-mail and instant messaging. Some social networks also allow users to share music or business contacts, while others allow individuals to publish web logs ("blogs") or socialize with friends and families.

There are several ways for users to interface with web and mobile services. For example, on a computer, a user can click command buttons of a service's web site with his or her mouse to control the service. On a cell phone, a jog wheel or a touchscreen can replace a mouse as an input device, or special hardware buttons (e.g., an e-mail button) provided by the manufacturer can be used, to control web and mobile services.

However, many consumers may not be able to access web and mobile services for various reasons. For instance, these individuals may not have the input devices (e.g., a touchscreen, special buttons) or access to the applications necessary to use the services. Even if a consumer has an applicable input device, such as a keyboard on his or her cell phone, the input device may be in a foreign language incompatible to the services, or not be provided with the necessary functions or function inputs.

Accordingly, there exists a need in the art to overcome the deficiencies and limitations described hereinabove.

SUMMARY OF THE INVENTION

In a first aspect of the invention, a method includes receiving, in a processor, a text-based command assigned to a service command configured to control at least one service of a computing device. The method also includes translating the text-based command into the service command based on a look-up table. The service command is provided to the service. The service is controlled based on the service command.

In another aspect of the invention, a computer program product includes a computer usable storage medium having readable program code embodied in the storage medium. The computer program product includes at least one component operable to receive a text-based command assigned to a service command configured to control a service of a computing device. The at least one component is further operable to translate the text-based command into the service command based on a look-up table, and to provide the service command to the service. The service is controlled based on the service command.

In yet another aspect of the invention, a computer system for exchanging commands includes a CPU, a computer readable memory and a computer readable storage media. The computer system additionally includes first program instructions to receive a text-based command assigned to a service command configured to control a service of a computing device. Second program instructions translate the text-based command into the service command based on a look-up table. Third program instructions provide the service command to the service. The service is controlled based on the service command. The first, second, and third program instructions are stored on the computer readable storage media for execution by the CPU via the computer readable memory. The text-based command includes at least one text-based symbol. The look-up table includes text-based commands. Each of the text-based commands are assigned to one or more service commands configured to control the at least one service. The computer system is implemented in at least one of a client device, the computing device, and a third-party service provider.

BRIEF DESCRIPTION OF THE DRAWINGS

The present invention is described in the detailed description which follows, in reference to the noted plurality of drawings by way of non-limiting examples of exemplary embodiments of the present invention.

FIG. 3A shows exemplary embodiments of text-based symbols according to aspects of the invention;

FIG. 3B shows exemplary embodiments of other text-based symbols according to aspects of the invention;

FIG. 4A shows an exemplary embodiment of a look-up table according to an aspect of the invention;

FIG. 4B shows an exemplary embodiment of another look-up table according to an aspect of the invention;

DETAILED DESCRIPTION OF THE INVENTION

The invention relates to a method, computer program product and computer system for exchanging commands and, more particularly, to a method, computer program product, computer system and telecommunication system for exchanging text-based commands between clients, servers, services, and/or applications. More specifically, the invention is directed to a text-based user interface for web and mobile services, applications, and hardware. In implementation, the invention uses symbols, such as those from the Global System for Mobile Communications (GSM) 03.38 alphabet, as commands for services. In embodiments, these symbols may be unified for all services. By implementing the present invention, consumers (users) can access and participate in web and mobile services, regardless of their input device technology and language.

For example, in operation, a user can enter a symbol on any user device, which is translated into a command related to some action, such as, subscribe to a blog. The blog can then subscribe the user to such blog, based on the input of this universally-accepted symbol. Advantageously, the user does not need special input devices, a blog-provided application, a keyboard in the blog service's language, or the like to control the blog. The present invention requires a text-based interface with the symbol to interact with the blog.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Figure 1:
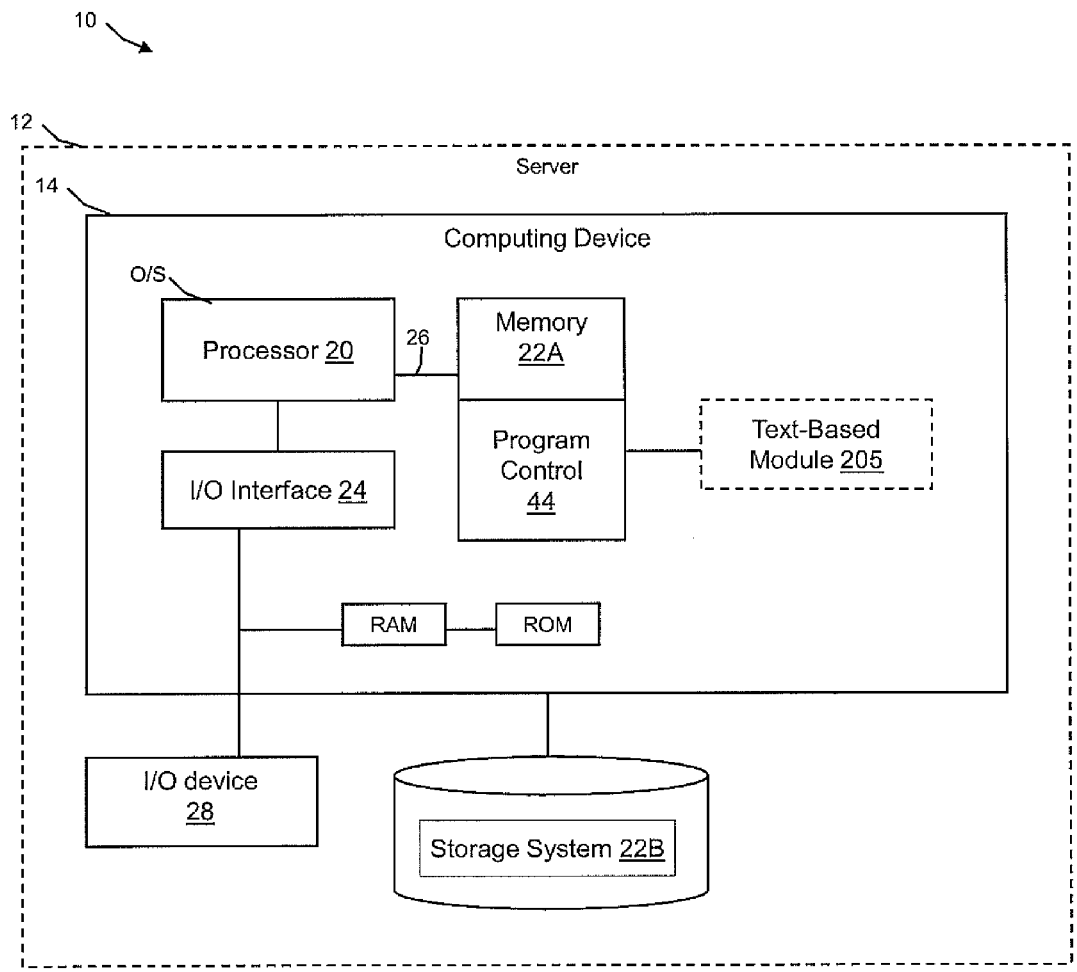
FIG. 1 shows an illustrative environment for implementing the steps in accordance with aspects of the invention.

FIG. 1 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, translating a text-based command assigned to a service command configured to control a service, into the service command, as will be discussed below.

The computing device 14 includes a text-based module 205 that may be a portion of the computer program code. Alternatively, the text-based module 205 may be located in computer program code of another computing device. For example, the text-based module 205 can be located on a client device, a third-party service provider, or a public or private server. Further for example, the text-based module 205 can be implemented as the following:
- a Graphical User Interface (GUI) application in a client device that can translate GUI commands into text-based commands;
- a standalone application in a client device;
- a gadget on a computer desktop or in a web site;
- a web site;
- an instant messaging client that communicates directly with a system server;
- an instant messaging web-based client that communicates directly with a system server;
- a Wireless Access Point (WAP) interface;
- an e-mail interface; and/or
- a Really Simple Syndication (RSS) interface.

The text-based module 205 performs the processes of the invention such as, for instance, translating a text-based command assigned to a service command configured to control a service, into the service command. The text-based command can then be acted upon by the requested service such as, for example, a social networking site.

Figure 2:
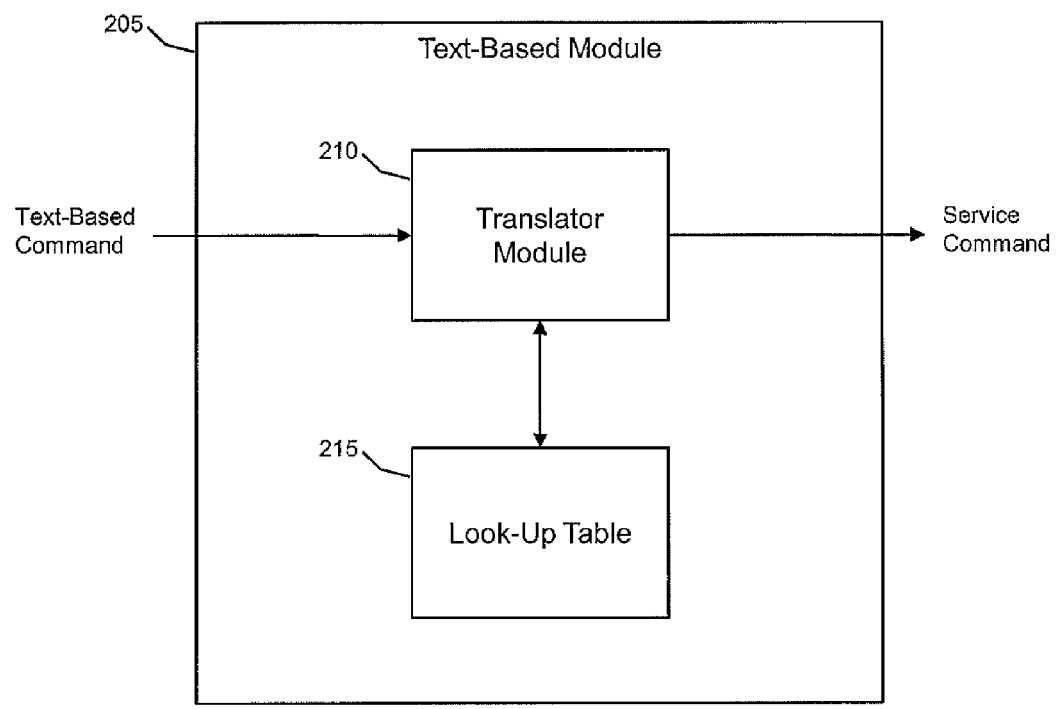
FIG. 2 shows an exemplary embodiment of a text-based module according to an aspect of the invention.

FIG. 2 shows an exemplary embodiment of the text-based module 205 according to an aspect of the invention. The text-based module 205 includes a translator module 210 and a look-up table 215. The translator module 210 and the look-up table 215 can be located, for example, on a server of a service provider, a networking node, or other content provider, as well as in an application on a user device.

Figures 3A, 3B:
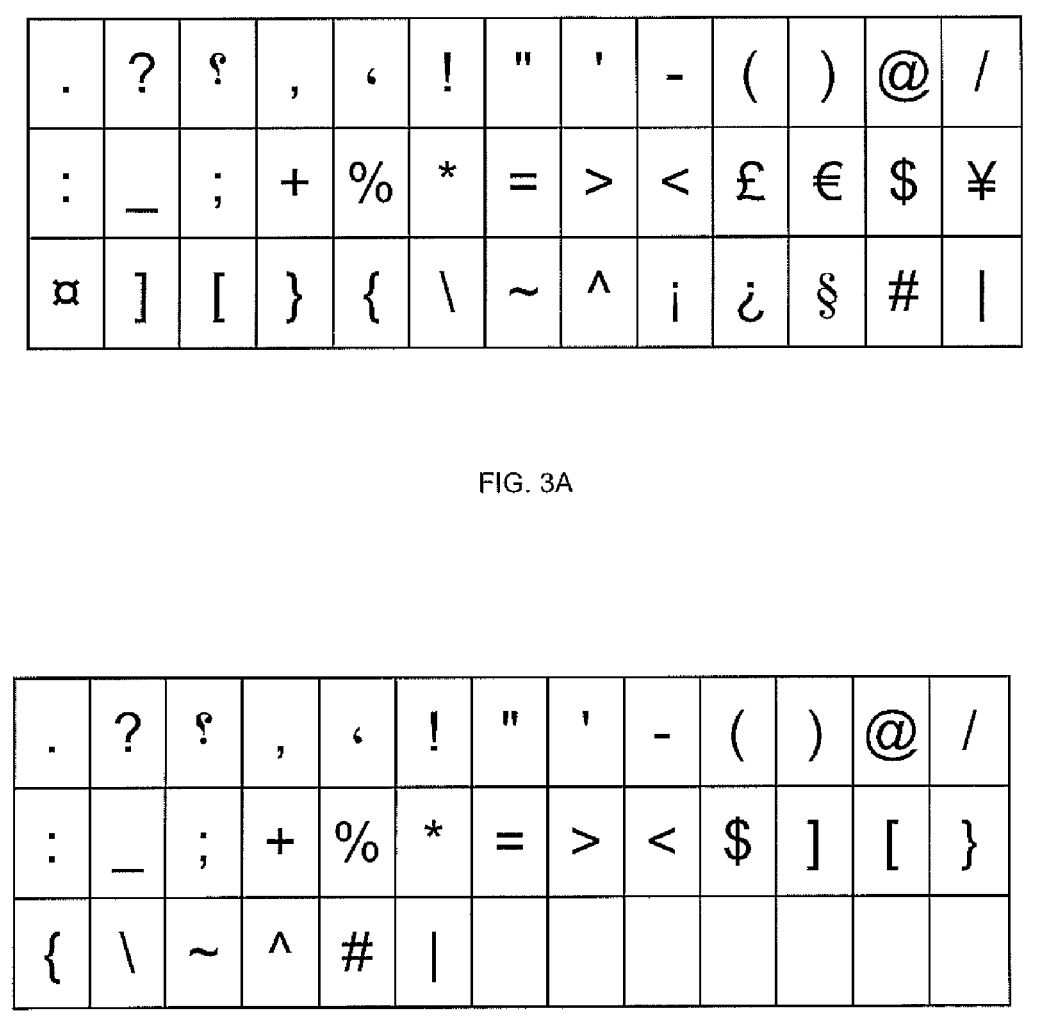

The translator module 210 receives a text-based command from a user device, a user interface, and/or the computing device 14 (e.g., a client device, a server of a service provider, a networking node) via the components of the device. The text-based command may include at least one text-based symbol from, for example, the GSM 03.38 alphabet, which is available in many cellular telephones or other portable computing devices. Symbols from this alphabet may include, for example, "!", "@", and others as shown in FIG. 3A. While using the GSM 03.38 alphabet may provide a unified standard of symbols available in many mobile phones, other standards are contemplated by the invention. For example, the text-based commands may include at least one text-based symbol from a QWERTY keyboard layout found on many English-language computer keyboards and mobile keypads. Symbols from this keyboard layout may include, for example, "{", "\", and others as shown in FIG. 3B. In embodiments of the invention, the text-based command may include at least one text-based key of an input device. For example, the text-based key may be a letter or a symbol of a computer keyboard or a cell phone keypad. In embodiments of the invention, the text-based command may include multiple text-based symbols or keys in a predefined combination, e.g., "##" and "$$". In embodiments, the text-based command may be an empty command (i.e., include a NULL value in a symbol field).

In embodiments, the text-based command is assigned to a service command configured to control at least one service of a server or computing system of a content provider such as a social network, an e-mail provider, a blog, etc. The service may include, for example, a social network service, a web service, a WAP service, a Short Message Service (SMS), and/or a Multimedia Messaging Service (MMS). In the case where the service is a social network service, the service command may include, for example, "send message," "write blog," and others that will be discussed in FIG. 4. In embodiments of the invention, the service command may be configured to control at least one application of a server or computing system. For example, the application may include a standalone application, a web application, a mobile application, and a bot application. In embodiments, the service command may be configured to control hardware functions of a computing system. For example, the computing system may include electronic advertisement screens, an electronic message board, and other machines, and the service command may be configured to turn these computing systems on and off, to display words, and other functions.

In embodiments of the invention, the text-based command may include the following syntax:
[<domain>][<symbol>][<number>][<message>]

The domain portion of the syntax refers to a destination of the text-based command. For example, the domain portion may be implemented by the Domain Name System (DNS), and thus may include an e-mail address, a web site address, or Internet Protocol (IP) addresses. Alternatively, the domain portion may include the criteria to search for these addresses. In embodiments of the invention, the domain portion may include a special address or domain name reserved for the text-based module 205. In further embodiments, the domain portion may include a user name or alias name used in a service. In additional embodiments, the domain portion may include a random pin number assigned to a user of a service, and/or a fax number to control a fax machine.

The symbol field of the syntax includes the at least one text-based symbol, text-based key, or a NULL value discussed above. For example, a service may interpret a NULL value in the symbol field as a command to "get the home page."

The number field may be used to pass numbers and/or number arguments, such as a desired page number of a blog at a social network service. In this example, if a user wants to read page 35 of a blog at "domain.com," and the symbol for "read blog" is ">", he or she could send the following text-based command:

domain.com>35.

In embodiments, the number field may be empty, and a service may interpret the empty number field as a command to read a last page of a blog.

The message field of the syntax may be utilized to send a message to a user or a service. For instance, a message may be from a user to another user, for technical support, or to update a blog. In the first case, if a user wants to send a message to another user at "email.com," and the symbol for "send message" is "$", he or she could send the following text-based command:

email.com $ Hello!

In embodiments, the message portion may be used as a command configured to control a service. For example, a service may be able to interpret an empty message field as a command to "get the home page."

In embodiments, the domain portion of the syntax may be directed to vehicle license plate numbers and/or letters. For example, to send a message to an owner of a vehicle with a vehicle license plate number ABC12345, a user could send the following text-based command:

ABC12345 $ You are driving nicely

To read a microblog of the owner, the user could send the vehicle license plate number ABC12345 in a message portion of a text-based command to a domain of a blog service, for example.

After the translator module 210 receives the text-based command, the translator module 210 translates the text-based command into the service command based on the look-up table 215. More specifically, the translator module 210 reads the text-based symbol or key, or the symbol field, of the text-based command and finds the symbol in the look-up table 215. Once the translator module 210 finds the symbol in the look-up table 215, the translator module 210 is able to read the corresponding service command, which is provided to the computing device 14 or another computing device. The service command may also include the domain, the number, and the message portions of the text-based command. The translated service command may be provided to the computing device 14 or another computing device (e.g., a service, a content provider) by, for example, the following:

SMS;
MMS;
Hypertext Transfer Protocol;
Short Message Peer-to-Peer protocol;
Simple Object Access Protocol;
Representational State Transfer (REST);
Extensible Messaging and Presence Protocol (XMPP);
RSS;
Atom;
E-mail (e.g., Post Office Protocol 3, Internet Message Access Protocol);
Multipurpose Internet Mail Extensions;
Unstructured Supplementary Service Data;
GSM;
Transmission Control Protocol; and/or
User Datagram Protocol.

FIG. 4A shows an exemplary embodiment of the look-up table 215 according to an aspect of the invention. The look-up table 215 includes text-based commands (e.g., keys), each of the text-based commands being assigned to one of service commands configured to control at least one service. As shown in FIG. 4A, the text-based keys may be symbols from the GSM 03.38 alphabet, for example, "(", ")", and "*".

Further, as shown in FIG. 4A, the service commands may include those for a social network service, such as "add member," "delete member," and "ban user." The service commands may additionally include those for a blog service, for instance, "delete tags," "write blog," and "delete blog." Some of the text-based keys may be "n/a," or not assigned to any service or application command. However, these keys may be later assigned for future use. That is, the look-up table 215 may be reconfigured for new services and applications.

In addition, the look-up table 215 may be unified for all services and applications to provide a consistent interface for users.

FIG. 4B shows another exemplary embodiment of the look-up table 215 according to an aspect of the invention. The look-up table 215 includes text-based commands (e.g., keys), each of the text-based commands being assigned to one of service commands configured to control at least one service. As shown in FIG. 4B, the text-based keys may also be letters from the GSM 03.38 alphabet, for instance, "t", "c", and "e". In embodiments, these keys may be reserved for a system to allow a user to execute system functions (e.g., "subscribe" and "delete all names") and/or to send messages to customer service or technical support by placing these keys in a domain portion of a text-based command. For example, the key "s" may be placed in a domain portion of a text-based command to send a question to technical support as follows:

s $ how can I register 2 names?

In embodiments, all one or two-letter words may be reserved for the system as domains for a user to execute system functions and/or to send messages. Accordingly, in such a system, a user would be required to register a domain of three letters or more.

Flow Diagram

Figure 5:
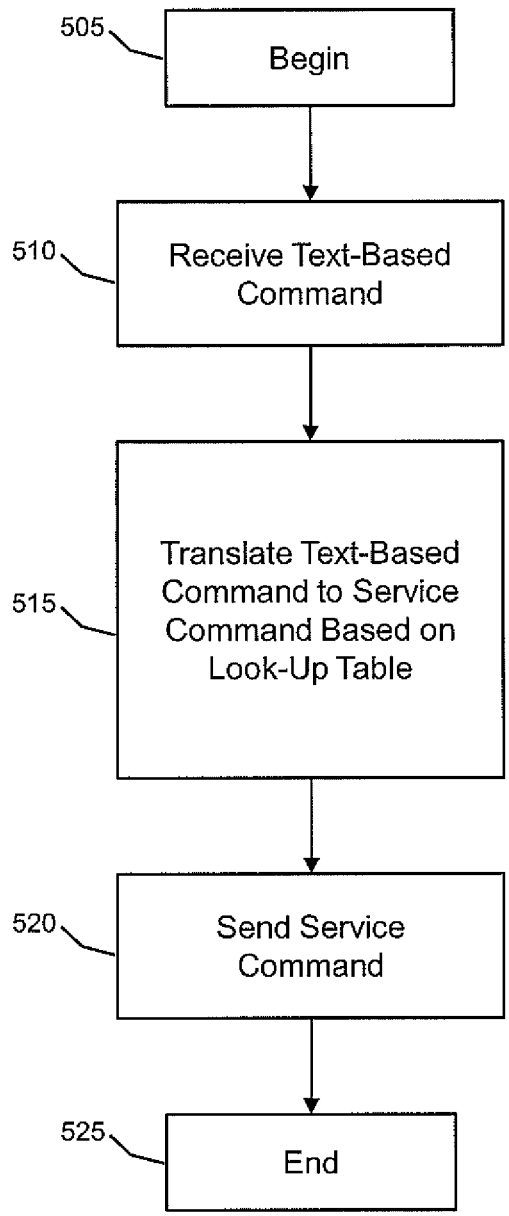
FIG. 5 shows an exemplary flow diagram implementing processes in accordance with aspects of the invention.

FIG. 5 shows a flow diagram implementing aspects of the present invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation. Furthermore, the invention can take the form of a computer program product accessible from a computer-usable or computer-readable medium providing program code for use by or in connection with a computer or any instruction execution system. The software and/or computer program product can be implemented in the environment of FIG. 1.

As shown in FIG. 5, at step 505, the process of the invention begins. At step 510, a text-based command is received from a computing system. At step 515, the received text-based command is translated into a service command based on a look-up-table of the invention. At step 520, the translated service command is provided to the computing system or to another computing system for use. For example, the service command may be provided to a content provider for action. The action can be, for instance, add or delete a member of a user's social network. At step 525, the process of invention ends.

Network for Exchanging Text-Based Commands

Figure 6:
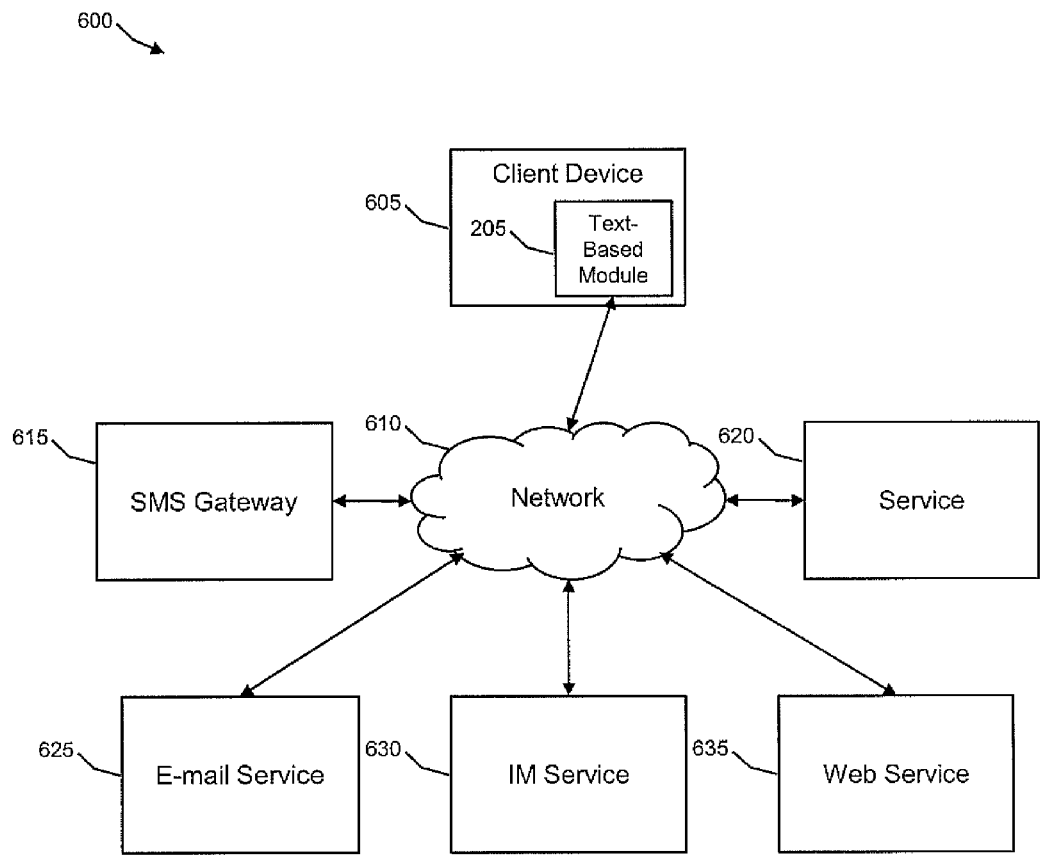
FIG. 6 shows an exemplary embodiment of a network for exchanging text-based commands in accordance with aspects of the invention.

FIG. 6 shows an exemplary embodiment of a network 600 for exchanging text-based commands in accordance with aspects of the invention. The network 600 may include a client device 605, a network 610, an SMS Gateway 615, a service 620, an e-mail service 625, an instant messaging (IM) service 630, and a web service 635. The client device 605, the SMS Gateway 615, the service 620, the e-mail service 625, the IM service 630, and the web service 635 may each include the server or computing system 12 and/or the computing device 14. For example, the client device 605 may include a mobile phone and/or a personal computer. The SMS Gateway 615 may also include other components of an SMS network, such as Mobile Switching Centers. The service 620 may be any type of service, including, for example, an SMS/MMS service, an e-mail service, an IM service, and/or a web service. The network 610 may be, for example, an IP network or a cellular network, and may include a plurality of computing systems to transfer data packets and/or radio signals within the network 610 and between the client device 605, the SMS Gateway 615, and the services 620, 625, 630, and 635.

In embodiments, the client device 605 may interface with a user of the service 620. To exchange commands between the client device 605 and the service 620, SMS messages may be transferred to the SMS Gateway 615 and then via the network 610 to the service 620. Alternatively, data packets and/or radio signals may be transferred from the client device 605, through the network 610, and to the service 620. For example, a user of the client device 605 may send an SMS message configured to request a ringtone from the service 620, which may be a ringtone service, via the network 610 and the SMS Gateway 615. However, this SMS message may have to be formatted in a manner prescribed by the service 620, e.g., with the name of the ringtone in a foreign language. In response, the service 620 may send an SMS message configured to request a credit card number from the user via the network 610 and the SMS Gateway 615. Commands may be exchanged between the client device 605 and other services, such as the e-mail service 625, the IM service 630, and/or the web service 635 in a similar fashion, i.e., via the network 610.

In embodiments, to exchange text-based commands, the text-based module 205 may be implemented in the client device 605. Thus, a user of the client device 605 may use a text-based command assigned to a service command configured to control the services 620, 625, 630, and/or 635. The text-based command is based on text-based symbols or keys that a user can easily access instead of, for example, foreign language keys or special hardware buttons. For example, the text-based symbols or keys can be the symbols shown in FIG. 3 and/or FIG. 4.

More specifically, a user may input a text-based command into the client device 605. The text-based module 205 receives the text-based command and translates it to a corresponding service command. The client device 605 provides the translated service command to at least one of the services 620, 625, 630, and 635. Accordingly, in this embodiment, the text-based module 205 may be an application downloaded and/or installed in the client device 605. For example, the text-based module 205 may be a Graphical User Interface (GUI) application, a gadget on a device desktop, part of an instant messaging client, part of e-mail application, and/or part of a Really Simple Syndication (RSS) application.

Figure 7:
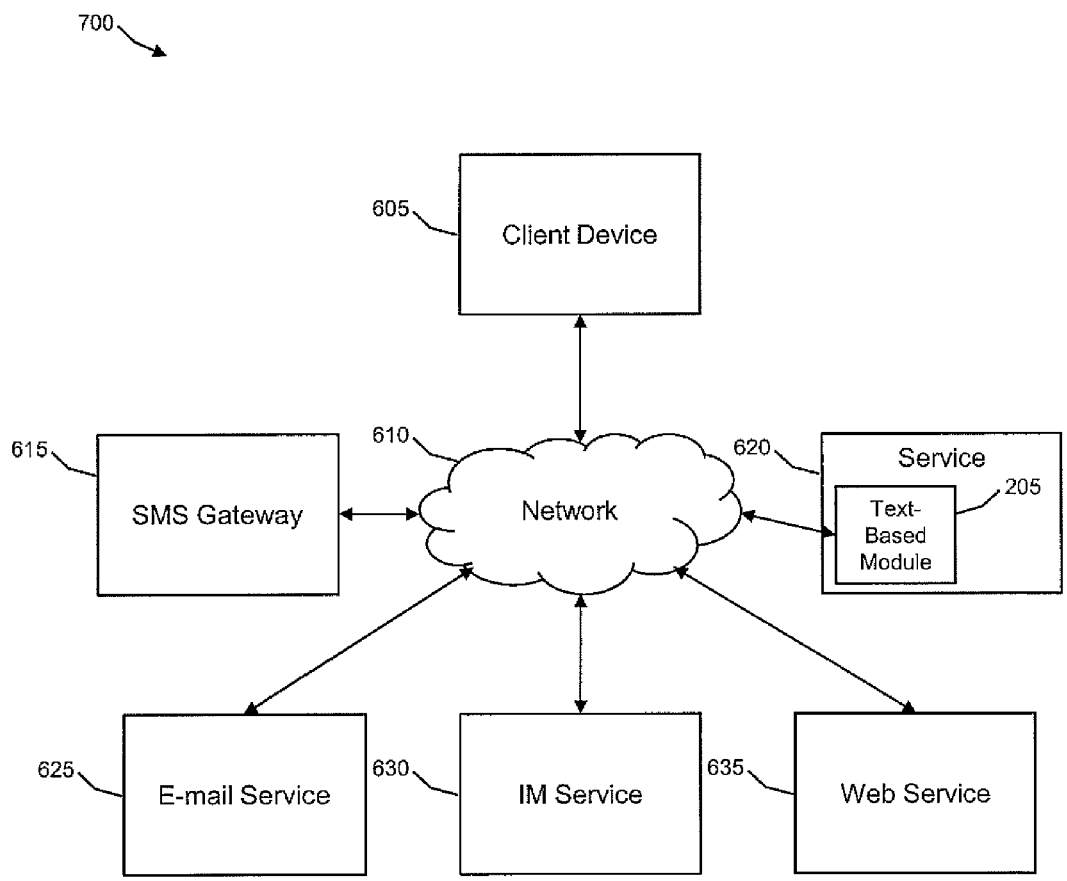
FIG. 7 shows another exemplary embodiment of a network for exchanging the text-based commands in accordance with aspects of the invention.

FIG. 7 shows another exemplary embodiment of a network 700 for exchanging the text-based commands in accordance with aspects of the invention. The network 700 may include the client device 605, the network 610, the SMS Gateway 615, the service 620, the e-mail service 625, the IM service 630, and the web service 635, as in FIG. 6. However, in this embodiment of the invention, instead of the text-based module 205 being implemented in the client device 605, the text-based module 205 may be implemented in the service 620, e.g., a content provider, a third-party service provider, etc.

In particular, a user may input a text-based command into the client device 605, which then sends the text-based command without translation to the service 620 via the network 610, the SMS Gateway 615, the e-mail service 625, the IM service 630, and/or the web service 635. The service 620 may receive and transfer the text-based command to the text-based module 205 for translation into a corresponding service command. The service 620 may then follow the translated service command as specified by the user. As such, in this embodiment, the text-based module 205 may be, for example, a web site, a web client, a web service application programming interface (API), and/or a WAP interface accessible to the user via the Internet, e.g., the network 610. In addition, the text-based module 205 may be at the backend of an SMS/MMS, e-mail, and/or IM service to unify their received commands.

In embodiments of the invention, the service 620 may only translate the text-based command from the user into the corresponding service command. The service 620 may then send the translated service command to another service, such as the e-mail service 625, the IM service 630, the web service 635, and/or an SMS/MMS service (not shown). These services may receive and follow the service command as specified by the user. That is, the service 620 including the text-based module 205 may be a third-party service that translates text-based commands into service commands for other services. This third-party service may be accessible to the user via the network 610 or the SMS Gateway 615.

In embodiments, the services may allow a user to do the following:
  order an electronic business card compatible with mobiles contact (e.g., a VCard) that belongs to another user;
  obtain a HTML code to add in a website to give visitors the ability to send the user a SMS message by using a form (from Internet to mobile); and/or
  write the user's name on his t-shirt, car, and/or bag, for example.

In embodiments, the text-based system may be used as or implemented in the following:
  a shopping interface (where a customer sends a shop name or restaurant name, obtains a numbered goods list or restaurant menu, sends numbers of goods needed and their quantities, gets an invoice for an order, pays by phone bill or credit card, and is shipped the order to the customer's location known by a Location-Based Service (LBS) or GPS);
  a bidding system (where a domain can be a name or code of a product being on bid; where any user can bid by sending a product name or code, a bid symbol, and a bid amount, and can obtain a last bid and a product description by sending the product name or code; and where a product owner can finish the bid and ask a last bid user to pay); and a voting or rating system (where a user can vote for somebody or some topic by sending a user name or topic name and a voting symbol (e.g., "%"), send a rating number (e.g., 1-10) after a voting—rating symbol, and obtain voting—rating top ten or all list results by sending the voting name (or the domain) and a double voting symbol (e.g., "%%")).

In further embodiments, the text-based system may be used as or implemented in the following:

a conference registration system (where a user can register a domain name for a conference, symposium, course, or lecture, and advertise the conference domain in a newspaper or dashboard at a school or university; where anyone can register to this conference by sending its domain then a subscribing symbol; and where the conference creator can get a list of subscribers and send them a message at once);

a costumer waiting system (where a user sends a service name, obtains a waiting number, and has his or her phone number registered in a service queue; where a service administrator sends a message to the system to call the next costumer; and where the next costumer receives a paging SMS message at his or her mobile phone); and an advertising system (where an advertiser takes a picture of a product by mobile and sends it to the system through MMS with a name of the product and a description; where any user can obtain the picture by sending the product name; and where the advertiser and the user can contact each other through the system).

In further embodiments, the text-based system may be used as or implemented in the following:

a system for taking notes (where a user can take notes by sending them to the system, and the system saves notes and sort them by date and/or time);

a diary (where users can save their diary by sending everyday updates); and an events manager (where a user can register an event domain name and a date and/or time via, for example, sending a SMS message to the system; where any other user can get this event by sending its name (domain) and an event symbol; where the user gets a vCalendar and saves it to his mobile or desktop calendar; and where the system sends alerts to event subscribes before the event).

In further embodiments, the text-based system may be used as or implemented in the following:

a project management tasks tracker (where a project manager creates a project by registering a project name or domain name, asks his team to join the project, and adds tasks to the project and assigns them to the project resources team; where the system alerts every resource about his or her task and deadline, and asks the team member if he completed the task or for a percentage of completion; and where the team and the manager can get updates on task and/or project progress);

a multiple-choice testing and exam system (where any user can create a new exam by registering an exam name (domain), and add questions followed by answers as a blog entry with special tags for correct answers; where the system recognizes the questions and answers and saves them as separate records in a database; where competitors can join the exam/competition and answer the questions; and when a time period of the exam is finished the system announce a winner(s)); and an expenses calculator and accounting manager (where a user sends every expenses paid to the system (a product/service name and a price); and where the system adds a date, calculates expenses, and sends results to the user daily/weekly/monthly as specified by the user).

In further embodiments, the text-based system may be used as or implemented in the following:

a micro-wild system (where any user can create a wiki (encyclopedia) entry by registering a term followed by a wiki symbol (e.g., "^"), add a definition for this term as they add a blog entry, and read definitions and rate them; and where the system sorts term definitions by ratings);

a SMS remote control (where a user can integrate a home controller computer with a system public service through the Internet, assign any symbol/key to one or more home control functions like turn light on/off, and send commands/symbols to the service; where the service sends commands to the integrated system; and where the user can integrate any hardware or software to the system to be remotely-controlled by the user); and an electronic message boards controller (where a message board owner registers a name (domain) for a message board and writes this name at the top of his board; where a user sends a text/picture ad to a message board as follows board domain $ ad text and where the board shows the text with a sender name).

In further embodiments, the text-based system may be used as or implemented in the following:

an instant group communication system (where at any mass of people an admin can register a group domain; and where other people can subscribe to this group and send a message to all);

a microblogging system (where famous people can register their names and communicate to fans); and an RSS reader and publisher (where any website can be integrated to the system by linking an RSS link to a domain name in the system; where any user can read/subscribe to a RSS by its domain; and where an admin can publish to a website RSS as he or she write a blog entry to the system).

In further embodiments, the text the text-based system may be used as or implemented in the following:

a forums system, where any user can create a forum topic by sending, for example:

topic name:topic description where any other users can add an entry to this topic by sending, for example:

topic name:topic entry text and where any other users can read the topic entry by sending:

topic name:page number a "for more information" system (where a user can register a domain for a small ad in a newspaper and write that domain in the ad; and where any ad reader can obtain more information about the ad/product/service by sending the ad, "for more information" domain to the service via mobile phone or/and email); and a books authoring system (where after a user adds multiple entries/articles to a blog, the user can create a small book containing all entries as book pages; where the system creates an e-book (e.g., a PDF or MMS mini book) from the blog pages; and where any other user can download the book to a mobile/desktop).

In further embodiments, the text the text-based system may be used as or implemented in the following:

an internet search engine system (where a user can search the Internet by sending:
  search criteria ?! search engine
  and where the system searches the criteria in a search engine and returns to the user a first result and a number of results found, and summarizes the results to be able to show in mobile messages); and
a machine translation system that translates, for example, messages and blog entries, between different languages.

In embodiments, the text-based system may include history records for every user, to recognize a last message or state. The text-based system may also execute short cut commands for a specific user. For example, when a user obtains a blog entry, the system may save this as a last text-based command for that user for a specified period of time (e.g., one hour). When the user wants to obtain the blog entry again, the user may send only a number (e.g., "3") as a short cut command instead of a full text-based command since the system knows which entry the user obtained previously based on the user's history records. The short cut commands simplify and shorten required parameters and information for the text-based system. For example, short cut commands may have the following functions:
  delete last entry;
  replay to last message;
  rate last user, blog entry, or micro-wiki entry;
  vote for last user, blog entry, micro-wiki entry, or vote question;
  obtain last user or blog entry; and/or
  answer last question.

The present invention provides a text-based user interface to control web and mobile services and applications. By using text-based symbols as commands, the present invention allows more consumers to use services and applications since the symbols may be more available on consumer technology such as mobile phones and in various languages. In addition, the present invention may include a unified system of symbols and syntax as commands, thus further increasing the accessibility of services and applications to users.

The foregoing examples have been provided for the purpose of explanation and should not be construed as limiting the present invention. While the present invention has been described with reference to an exemplary embodiment. Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method, comprising:
  receiving, in a processor, a text-based command assigned by a user to a service command configured to be unified for all services and applications amongst a plurality of computing devices, accessible by the user, to provide a consistent user interface and allowing the user access and participation in web and mobile services regardless of input technology and language;
  translating the text-based command into the service command based on a look-up table to thereby control at least one service; and
  providing the service command to the service, wherein the service is controlled based on the service command.

2. The method of claim 1, wherein the text-based command comprises at least one text-based symbol that is assigned to the service command configured for the different services and applications amongst the plurality of computing devices.

3. The method of claim 1, wherein the at least one text-based command comprises a symbol from a global system for mobile communications alphabet that is assigned to the service command configured for the different services and applications amongst the plurality of computing devices.

4. The method of claim 1, wherein the text-based command comprises, within a body of a message, a domain field, a symbol field, a number field, and a message field.

5. The method of claim 1, wherein the text-based command is assigned to an application command configured to control at least one of the applications of the plurality of computing devices.

6. The method of claim 1, wherein the services comprise at least one of a social network service, a web service, a wireless application protocol service, a short message service, and a multimedia messaging service.

7. The method of claim 1, wherein the look-up table comprises text-based commands, wherein each of the text-based commands are assigned to one or more service commands configured to control the at least one of the services.

8. The method of claim 1, wherein the method is performed by a client device, and wherein the providing comprises sending the service command from the client device.

9. The method of claim 1, wherein the method is performed by at least one of the plurality of computing devices and a third-party service provider, and wherein when the method is performed by the third-party service provider, the providing comprises sending the service command from the third-party service provider.

10. The method of claim 1, wherein:
  saving the text-based command as a last text-based command; and
  executing a short cut command based on the saved last text-based command.

11. A computer program product comprising a computer usable storage device having readable program code embodied in the storage device and operable to be processed by a computing infrastructure, the computer program product includes at least one component operable to:
  receive a text-based command assigned by a user to a service command configured to be unified and allow control for all services and applications amongst a plurality of computing devices, accessible by the user, with providing a consistent user and allowing the user access and participation in web and mobile services regardless of input technology and language;
  translate the text-based command into the service command based on a look-up table; and
  provide the service command to the service, wherein the service is controlled based on the service command.

12. The computer program product of claim 11, wherein the text-based command comprises at least one text-based symbol.

13. The computer program product of claim 11, wherein the at least one text-based command comprises a symbol from a global system for mobile communications alphabet.

14. The computer program product of claim 11, wherein the text-based command, within a body of a message, comprises a domain field, a symbol field, a number field, and a message field.

15. The computer program product of claim 11, wherein the text-based command is assigned to an application command configured to control one or more of the applications of one of the plurality of computing devices.

16. The computer program product of claim 11, wherein at least one of the services comprises at least one of a social network service, a web service, a wireless application protocol service, a short message service, and a multimedia messaging service.

17. The computer program product of claim 11, wherein the look-up table comprises text-based commands, wherein each of the text-based commands are assigned to one or more service commands configured to control the at least one of the services.

18. The computer program product of claim 11, wherein the computer program product is implemented in a client device, and wherein the provision of the service command comprises sending the service command from the client device.

19. The computer program product of claim 11, wherein the computer program product is implemented in at least one of the plurality of computing devices and a third-party service provider, and wherein when the computer program product is implemented in the third-party service provider, the provision of the service command comprises sending the service command from the third-party service provider.

20. A computer system for exchanging commands, the system comprising:
   a CPU, a computer readable memory and a computer readable storage media;
   first program instructions to receive a text-based command assigned by a user to a service command configured to be unified for all services and applications amongst a plurality of computing devices, accessible by the user, to provide a consistent user interface and thereby allowing the user access and participation in web and mobile services regardless of input technology and language;
   second program instructions to translate the text-based command into the service command based on a look-up table; and
   third program instructions to provide the service command to the service, wherein the service is controlled based on the service command,
   wherein the first, second, and third program instructions are stored on the computer readable storage media for execution by the CPU via the computer readable memory,
   wherein the text-based command comprises at least one text-based symbol,
   wherein the look-up table comprises text-based commands, wherein each of the text-based commands are assigned to one or more service commands configured to control the at least one service, and
   wherein the computer system is implemented in at least one of a client device, the computing device, and a third-party service provider.

* * * * *